United States Patent
Ikeda et al.

(10) Patent No.: US 6,839,559 B2
(45) Date of Patent: Jan. 4, 2005

(54) RETRANSMISSION CONTROL METHOD AND THE APPARATUS

(75) Inventors: Takehiro Ikeda, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 464 days.

(21) Appl. No.: 09/987,264

(22) Filed: Nov. 14, 2001

(65) Prior Publication Data

US 2002/0058493 A1 May 16, 2002

(30) Foreign Application Priority Data

Nov. 15, 2000 (JP) ........................................ 2000-348517

(51) Int. Cl.[7] .............................. H04Q 7/20; H04L 1/18; H04L 12/28; H04L 12/56; G08C 25/02
(52) U.S. Cl. ................. 455/442; 455/435.1; 455/67.11; 455/69; 455/70; 455/436; 455/524; 714/748; 714/749; 714/746; 714/750; 714/751; 370/390; 370/432; 370/335; 370/394; 370/328; 370/338; 370/388
(58) Field of Search .............................. 455/442, 435.1, 455/67.11, 69, 70, 436; 370/388, 390, 432, 328, 338, 394; 714/748, 749, 746, 750, 751

(56) References Cited

U.S. PATENT DOCUMENTS 6,072,790 A * 6/2000 Neumiller et al. .......... 370/338
6,341,124 B1 * 1/2002 Johansson et al. .......... 370/335
6,377,560 B1 * 4/2002 Dailey ........................ 370/329
6,421,539 B1 * 7/2002 Jeong .......................... 455/442
6,507,572 B1 * 1/2003 Kumar et al. ............... 370/335
6,553,032 B1 * 4/2003 Farley et al. ............... 370/394
6,567,387 B1 * 5/2003 Dulin et al. ................ 370/329
6,643,813 B1 * 11/2003 Johansson et al. .......... 714/748
6,678,249 B2 * 1/2004 Toskala et al. ............. 370/236
6,678,523 B1 * 1/2004 Ghosh et al. ............... 455/442
2002/0028687 A1 * 3/2002 Sato et al. .................. 455/466
2004/0013105 A1 * 1/2004 Ahmavaara et al. ........ 370/349

FOREIGN PATENT DOCUMENTS

| EP | 0 687 078 | 12/1995 |
| EP | 1 037 491 | 9/2000 |
| WO | WO 99/13652 | 3/1999 |
| WO | WO 00/62467 | 10/2000 |

* cited by examiner

*Primary Examiner*—Rafael Perez-Gutierrez
*Assistant Examiner*—Ismael Quiñones
(74) *Attorney, Agent, or Firm*—Oblon, Spivak, McClelland, Maier & Neustadt P.C.

(57) ABSTRACT

A retransmission control method is provided. In the method, all base stations perform error judgment for a signal sent from a mobile station 1. Then, first and second base stations send results of error judgment to a third base station which is a communication partner of the mobile station 1. The third base station sends NACK for requesting retransmission to the mobile station 1 only when every result of error judgment of the first and second base stations indicates that there is an error.

6 Claims, 4 Drawing Sheets

| NODE | UNIQUE IP ADDRESS |
|---|---|
| BASE STATION 2-1 | xxx.xxx.0.1 |
| BASE STATION 2-2 | xxx.xxx.0.2 |
| BASE STATION 2-3 | xxx.xxx.0.3 |
| . | . |
| . | . |
| BASE STATION 2-N | xxx.xxx.0.N |
| MOBILE STATION 1 | xxx.xxx.2.1 |

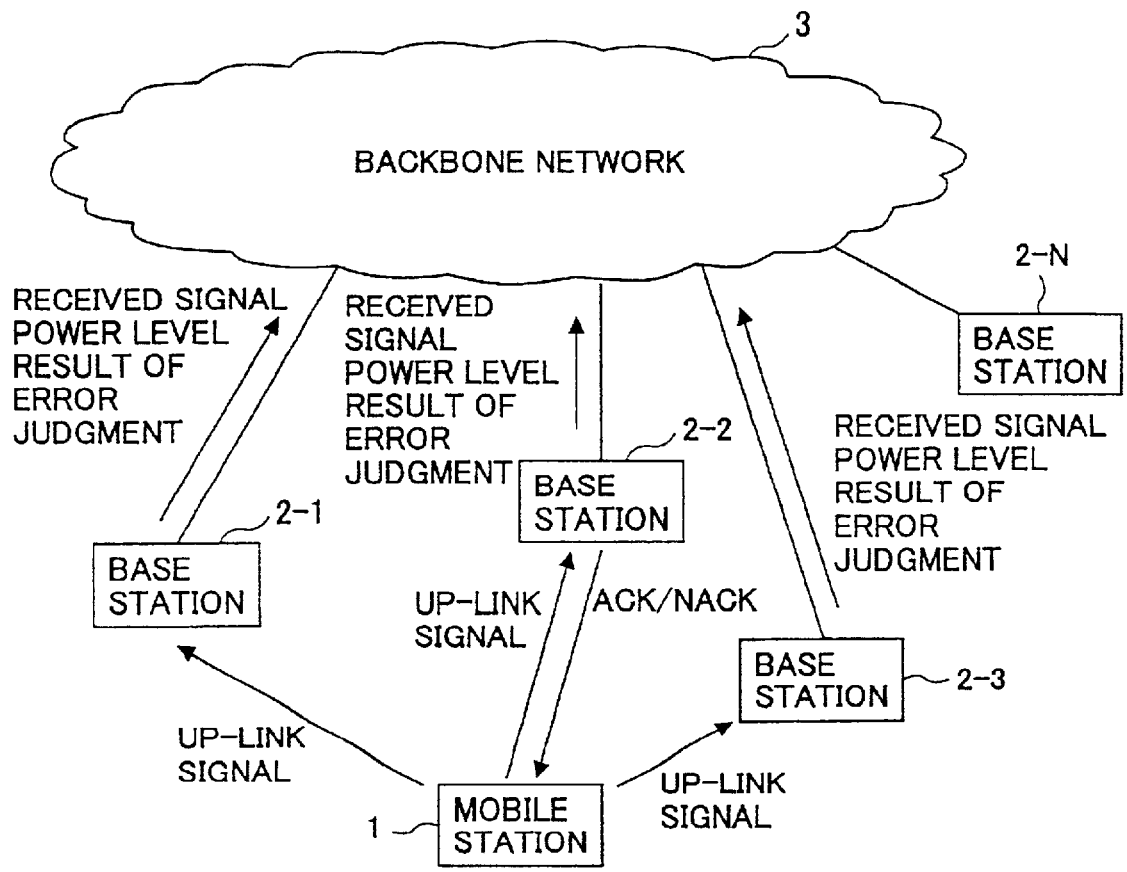

FIG.3

| MOBILE STATION ADDRESS | BASE STATION ADDRESS | RESULT OF ERROR JUDGMENT | RECEIVED SIGNAL POWER LEVEL |
|---|---|---|---|
| xxx.xxx.2.1 | xxx.xxx.0.1 | NG | XXX |
| xxx.xxx.2.1 | xxx.xxx.0.2 | OK | YYY |
| xxx.xxx.2.1 | xxx.xxx.0.3 | NG | ZZZ |
| ⋮ | ⋮ | ⋮ | ⋮ |

RETRANSMISSION CONTROL METHOD AND THE APPARATUS

BACKGROUND OF THE INVENTION

1. Field of the Invention

The present invention relates to a retransmission control method and the apparatus in a base station for performing retransmission control for a signal sent from a mobile station.

2. Description of the Related Art

Conventionally, a method of sending acknowledgment is usually adopted as a retransmission control method in communication systems. In this method, when a receiver receives a signal which is sent from a sender, the receiver judges whether the signal is correctly received, that is, whether the signal includes an error. When the signal is correctly received, the receiver sends ACK (acknowledgement) which indicates that retransmission is unnecessary to the sender. When the signal is not correctly received, the receiver sends NACK (negative acknowledgement) for requesting retransmission to the sender. When the sender receives NACK, the sender retransmits a signal corresponding to the previously transmitted signal.

This retransmission control method is also adopted in a communication system in which mobile stations and base stations communicate each other via communication channels. For example, as far as retransmission control for a signal sent from a mobile station to a base station (which will be called an up-link signal hereinafter) is considered, an mobile station which plays a role of a sender sends a signal to a corresponding base station with which the mobile station communicates, that is, a communication partner of the mobile station. The base station performs error judgment for the received up-link signal. When there is an error in the received signal, the base station sends NACK to the mobile station. On the other hand, when there is not any error, the base station sends ACK to the mobile station. When the mobile station receives NACK, the mobile station retransmits a corresponding up-link signal.

In the above-mentioned communication system in which an up-link signal from a mobile station is received by one or more base stations other than a corresponding base station with which the mobile station communicates, there is a case in which a base station adjacent to the corresponding base station correctly receives the signal even when the corresponding base station does not correctly receive the signal.

However, in the conventional retransmission control method, when the corresponding base station judges that the up-link signal includes an error, the corresponding base station sends NACK to the mobile station even if other base station correctly receives the signal. Such inefficient retransmission control increases load for retransmission process. In addition, such retransmission control becomes a factor for preventing effective use of communication channels.

SUMMARY OF THE INVENTION

An object of the present invention is to provide an effective retransmission control method and an apparatus performing effective retransmission control.

The above object is achieved by a retransmission control method including the steps of:

base stations receiving a signal sent from a mobile station;
each of the base stations performing error judgment for the signal sent from the mobile station;
a corresponding base station of a communication partner of the mobile station obtaining results of error judgment of the corresponding base station and other base stations;
the corresponding base station sending a response which indicates that retransmission is not required to the mobile station when at least one result indicates that there is no error; and
the corresponding base station sending a response which indicates that retransmission is required to the mobile station when every result indicates that there is an error.

According to this retransmission control method, every base station which received the up-link packet from the mobile station performs error judgment, and, when at least one base station judges that there is no error, ACK signal which indicates that retransmission is not required is sent to a mobile station by the corresponding base station. Therefore, retransmission process is reduced maximally so that effective retransmission control becomes possible. As a result, load of retransmission process can be reduced and communication channels can be used effectively.

The above object is also achieved by a retransmission control method including the steps of:

base stations receiving a signal sent from a mobile station;
each of the base stations performing error judgment for the signal sent from the mobile station;
the base stations exchanging results of the error judgment with one another;
a corresponding base station sending a response which indicates that retransmission is not required to the mobile station when at least one result from the base stations indicates there is no error; and
the corresponding base station sending a response which indicates that retransmission is required to the mobile station when every result from the base stations indicates that there is an error.

Also according to this retransmission control method, retransmission process is reduced maximally so that effective retransmission control can be possible. As a result, load of retransmission process can be reduced and communication channels can be used effectively.

In the retransmission control method, a value of received signal power level can be included in the exchanging error judgement results.

It can be considered that, when the base station has the largest received signal power level from a mobile station, a received signal power level of a signal sent from the base station to the mobile station is also largest. Therefore, by sending a response for retransmission control signal from such base station to the mobile station, the possibility of receiving the response by the mobile station can be increased so that retransmission control can be performed with more reliability.

The above object is also achieved by a retransmission control apparatus in a base station, including:

a part receiving a signal sent from a mobile station;
a part performing error judgment for the signal sent from the mobile station;
a part obtaining results of error judgment of the base station itself and other base stations;
a part sending a response which indicates that retransmission is not required to the mobile station when at least one result indicates that there is no error; and
a part sending a response which indicates that retransmission is required to the mobile station when every result indicates that there is an error.

The above object is also achieved by a retransmission control apparatus in a base station, including:

a part receiving a signal sent from a mobile station;

a part performing error judgment for the signal sent from the mobile station;

a part exchanging results of the error judgment with other base stations;

a part sending a first response which indicates that retransmission is not required to the mobile station when at least one result indicates there is no error; and a part sending a second response which indicates that retransmission is required to the mobile station when every result of the error judgments indicates that there is an error.

In the retransmission control apparatus, the first response or the second response is returned to the mobile station by the base station which has the highest received signal power level of up-link packet sent from the mobile station.

According to the above invention, a retransmission control apparatus suitable for performing the retransmission control method can be provided.

BRIEF DESCRIPTION OF THE DRAWINGS

FIG. 2A shows a network configuration example of a communication system of a second embodiment to which the retransmission control method and apparatus of the present invention are applied;

FIG. 2B shows nodes, the corresponding unique IP addresses and base station multicast addresses;

FIG. 3 shows a structure example of a retransmission control table used in the second embodiment;

DETAILED DESCRIPTION OF THE PREFERRED EMBODIMENTS

In the following, embodiments of the present invention will be described with reference to figures.

Figures 1A, 1B:
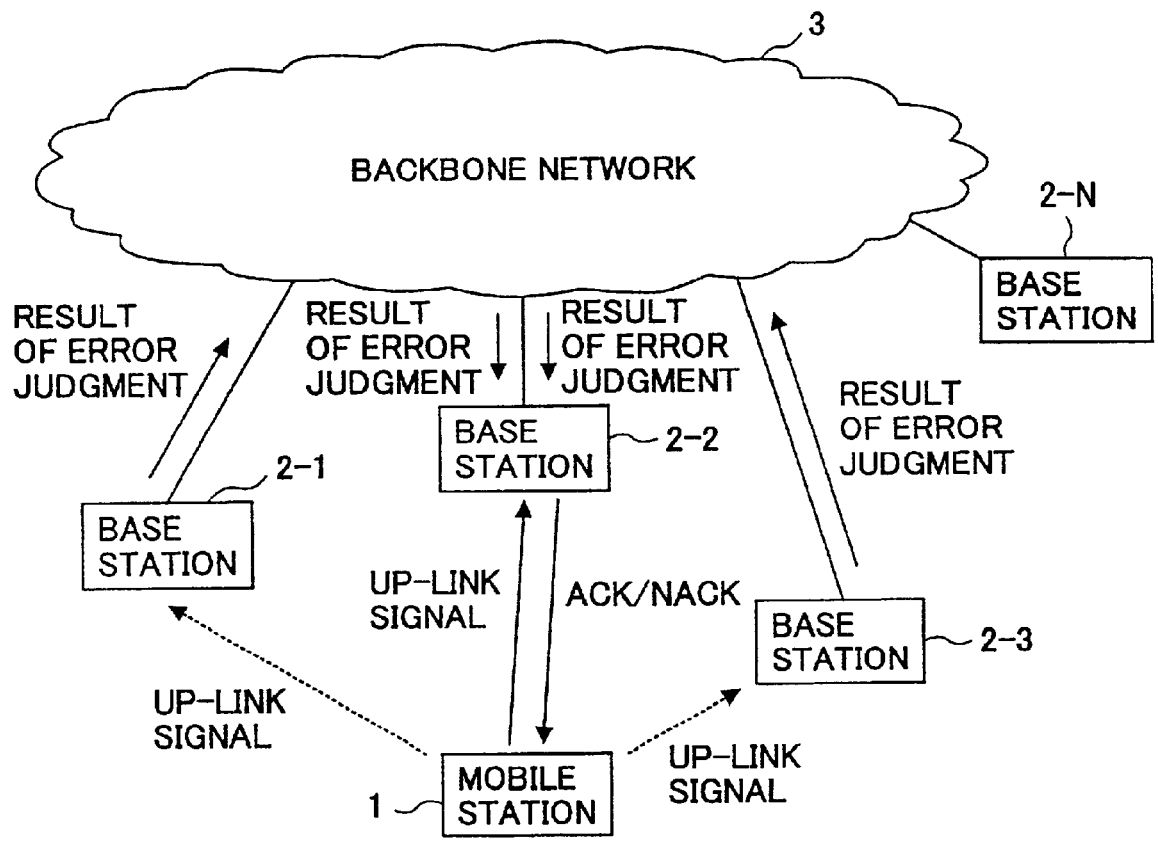
FIG. 1A shows a network configuration of a communication system of a first embodiment to which a transmission control method and the apparatus of the present invention are applied.
FIG. 1B shows nodes and the corresponding unique IP addresses.

FIG. 1A shows a network configuration of a communication system of a first embodiment to which the retransmission control method and the apparatus of the present invention are applied.

In the communication system shown in the figure, some base stations receive an up-link signal sent from a mobile station. Each of the base stations performs error judgment for the received signal. In addition, a corresponding base station which is a specific base station with which the mobile station communicates obtains results of error judgment from every base station which received the signal from the mobile station. Then, the corresponding base station sends NACK for requesting retransmission to the mobile station only when all results of error judgment indicate that the signal includes an error.

The communication system includes a mobile station 1, N base stations 2-1 through 2-N and a backbone network 3. The communication system is configured as an IP network so that a unique IP address is assigned to each of the base stations 2-1 through 2-N as shown in FIG. 1B.

In this example, a mobile station 1 communicates with the base station 2-2 as its communication partner so that the mobile station 1 sends an up-link signal to the base station 2-2. In this system, the up-link signal can be received by adjacent base stations 2-1 and 2-3 in addition to the base station 2-2.

Each of the base stations 2-1 through 2-3 which has received the up-link signal judges whether the received up-link signal includes an error. After the error judgment is performed by each base station, each of the base stations 2-1 and 2-3 sends the result of the error judgment, via the backbone network 3, to the base station 2-2 which is the communication partner of the mobile station 1. In this example, the base stations 2-1 and 2-3 can recognize that the base station 2-2 is the communication partner of the mobile station 1 by using the up-link signal.

For example, when the up-link signal includes an IP address of the base station 2-2 as a destination address or a routing header address, the base stations 2-1 and 2-3 can recognize that the base station 2-2 is the communication partner of the mobile station 1. In addition, when the base stations 2-1 and 2-3 send the result of the error judgment, the result of error judgment can be sent to the base station 2-2 by using the IP address as a destination.

When the base station 2-2 receives the results of error judgment from the base stations 2-1 and 2-3, the base station 2-2 analyzes these results and a result of error judgment in the base station 2-2 itself, and judges whether the results indicate that there is no error in the received up-link signal. When at least one result indicates that there is no error in the received signal, it is not necessary for the mobile station 1 to retransmit the up-link signal because the signal received by a base station which sends the result indicating that there is no error can be used. Therefore, in this case, the base station 2-2 returns ACK to the mobile station 1. When the mobile station 1 receives the ACK, the mobile station 1 does not retransmit the signal.

On the other hand, when the results of error judgment do not include any result indicating that there is no error, that is, when every result indicates that the received up-link signal has an error, any signal which is received by any base station can not be used. Thus, in this case, the base station 2-2 returns NACK to the mobile station 1. When the mobile station 1 receives the NACK, the mobile station 1 retransmits the corresponding up-link signal.

As mentioned above, according to the communication system of this embodiment, not only the base station of the communication partner of the mobile station, but also other base stations which receive an up-link signal from the mobile station judge error of the up-link signal. When there is a base station which judges that there is no error in the received signal, ACK is sent to the mobile station and the mobile station does not retransmit the corresponding signal. Therefore, since the retransmission processing can be suppressed maximally, efficient transmission control can be realized.

In this embodiment, although the destination to which the result of error judgment is sent is the base station 2-2 with which the mobile station communicates, the destination is not limited to the base station 2-2. The destination can be any other base station.

Next, a second embodiment will be described. FIG. 2A shows a network configuration example of a communication system of the second embodiment to which the retransmission control method and apparatus of the present invention are applied.

In the communication system shown in FIG. 2A, some base stations receive an up-link signal sent from a mobile station. Each of the base stations performs error judgment of received signal and measures a received signal power level, and the base stations exchange the results of error judgment and the received signal power levels with each other. Then, only when every result of error judgment indicates that there is an error, a base station in which the received signal power level is the largest sends NACK to the mobile station.

This communication system includes a mobile station 1, N base stations 2-1 through 2-N, and a backbone network 3 like the communication system shown in FIG. 1 A. This communication system forms an IP network in which each of the base stations 2-1 through 2-N has a unique IP address. In addition to the unique IP address, each of the base stations 2-1 through 2-N has a same IP address (base station multicast address) in order to allow multicast communication as shown in FIG. 2B.

This embodiment corresponds to a case where the mobile station 1 sends an up-link signal without specifying a base station of a communication partner of the mobile station. The up-link signal is received by the base stations 2-1 through 2-3.

Each of the base stations 2-1 through 2-3 which received the up-link signal judges whether the received up-link signal includes an error and measures the power level (received power level). The result of error judgment and the received power level is included in a multicast packet which has the base station multicast address as its destination. The multicast packet is sent to other base stations via backbone network 3.

When the base stations 2-1 through 2-3 receive the multicast packet, each base station generates a retransmission control table from the results of error judgment and the received signal power levels included in the multicast packets and the result of error judgment and the received signal power level obtained by the base station itself.

FIG. 3 shows a structure example of the retransmission control table. The retransmission control table includes mobile station addresses, base station addresses, results of error judgment and received signal power levels. The mobile station addresses are IP addresses of mobile stations which sent the up-link signal, and the base station addresses are IP addresses of base stations which received the up-link signal. The mobile station address, the base station address, the result of error judgment and the received signal power level are associated with each other.

After generating the retransmission control table, each of the base stations 2-1 through 2-3 judges whether the received signal power level of the base station itself is larger than any other received signal power levels in the retransmission control table. The base station having the largest received signal power level analyzes the results of error judgment in the retransmission table and judges whether the table includes an result of error judgment indicating that the received up-link signal includes no error.

In the same way as the first embodiment, when the table includes the result of error judgment indicating the received up-link signal includes no error, the base station sends ACK to the mobile station. The mobile station which receives ACK does not retransmit the signal. On the other hand, when the table does not include the result of error judgment indicating no error, that is, when every result of error judgment indicates that the received up-link signal includes an error, the base station sends NACK to the mobile station. The mobile station which receives NACK retransmits the signal.

Figure 4:
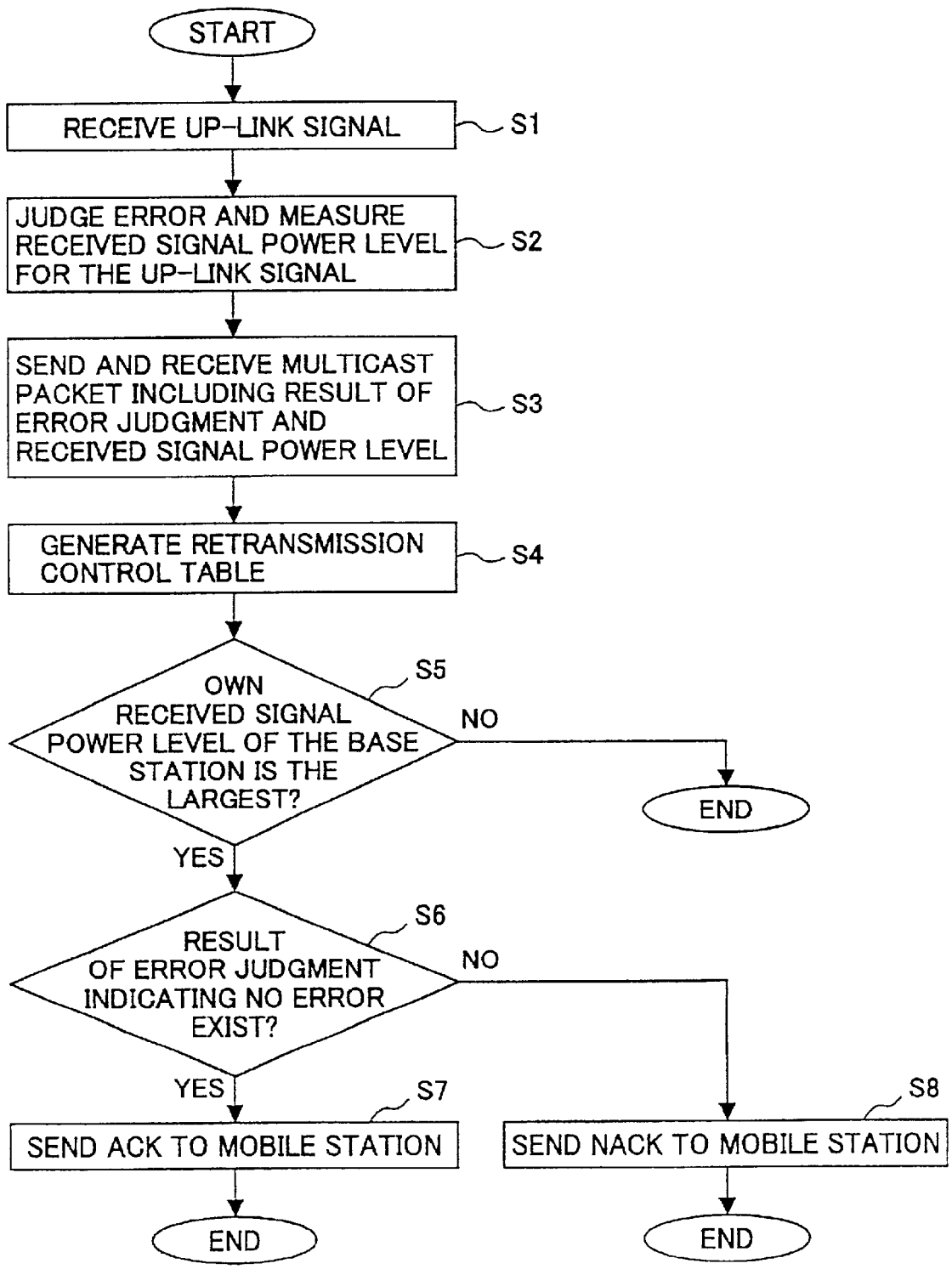
FIG. 4 shows a flowchart of the operation of an base station in the second embodiment.

FIG. 4 shows a flowchart of the operation of the base station in the second embodiment. When the base stations 2-1 through 2-3 receive the up-link signal from the mobile station 1 in step 1, each base station judges whether the up-link signal includes an error and measures the received signal power level in step 2. Then, each base station sends the multicast packet which includes the result of error judgment and the received signal power level, and receives multicast packets from other base stations in step 3.

Next, each base station generates the retransmission control table from the results of error judgment and the received signal power levels included in the multicast packets, and the result of error judgment and the received signal power level of the base station itself in step 4. Then, each base station analyzes the received signal power levels in the retransmission control table and judges whether the received signal power level of the base station itself is larger than any other received signal power levels in the table in step 5. When the received signal power level of the base station itself is not larger than any other received signal power levels in the table, the base station ends the process.

On the other hand, when the received signal power level of the base station itself is larger than any other received signal power levels in the table, the base station analyzes the results of error judgment in the retransmission control table and judges whether the table includes an result of error judgment indicating no error in step 6.

When the table includes the result of error judgment indicating no error, the base station sends ACK to the mobile station 1 in step 7. When the table does not include the result of error judgment indicating no error, the base station sends NACK to the mobile station 1 in step 8.

According to the communication system in this embodiment, not only the base station of a communication partner of the mobile station, but also other base stations which receives the up-link signal from the mobile station perform error judgment for the up-link signal. In addition, when a base station judges that the signal does not include an error, ACK is sent to the mobile station. Therefore, since retransmission is not performed, retransmission processing is suppressed maximally so that efficient retransmission control can be possible.

In addition, according to this embodiment, a base station having the largest received signal power level for the up-link signal sends ACK or NACK to the mobile station. Therefore, since it can be considered that a received signal power level in the mobile station is large if the base station having the largest received signal power level sends a signal to the mobile station, the possibility of receiving ACK or NACK by the mobile station can be increased. As a result, retransmission control can be performed with more reliability.

As mentioned above, according to the present invention, each of base stations which receive a signal from a mobile station performs error judgment of the signal. When there is at least one base station which judges that the signal includes no error, ACK which indicates that retransmission is unnecessary is sent to the mobile station so that retransmission is not performed. Therefore, retransmission process can be suppressed maximally, efficient retransmission control can be possible, load of performing retransmission process can be decreased, and communication channels can be used effectively.

The present invention is not limited to the specifically disclosed embodiments, and variations and modifications may be made without departing from the scope of the invention.

What is claimed is:

1. A retransmission control method comprising the steps of:

base stations receiving a signal sent from a mobile station;

each of said base stations performing error judgment for said signal sent from said mobile station;

a corresponding base station of a communication partner of said mobile station obtaining results of error judgment of said corresponding base station and other base stations;

said corresponding base station sending a response which indicates that retransmission is not required to said mobile station when said results includes a result indicating no error; and said corresponding base station returning a response which indicates that retransmission is required to said mobile station when every result in said results indicates that there is an error.

2. A retransmission control method comprising the steps of:

base stations receiving a signal sent from a mobile station;

each of said base stations performing error judgment for said signal sent from said mobile station;

said base stations exchanging results of said error judgment with one another;

a corresponding base station sending a response which indicates that retransmission is not required to said mobile station when results of said error judgment of said base stations include a result indicating no error; and said corresponding base station returning a response which indicates that retransmission is required to said mobile station when every result of said error judgment of said base stations indicates that there is an error.

3. The retransmission control method as claimed in claim 2, wherein a received signal power level of said signal in said corresponding base station is the largest among received signal power levels in said base stations.

4. A retransmission control apparatus in a base station, comprising:

a part receiving a signal sent from a mobile station;

an error judgment part performing error judgment for said signal sent from said mobile station;

a part receiving, from other base stations via a network, error judgment results in said other base station each of which receives said signal;

a part sending a response which indicates that retransmission is not required to said mobile station when said error judgment results of said other base stations and an error judgment result by said error judgment part includes at least one result indicating no error; and a part sending a response which indicates that retransmission is required to said mobile station when every result of said error judgment results of said other base stations and said error judgment result by said error judgment part indicates that there is an error.

5. The retransmission control apparatus as claimed in claim 4, wherein said base station is a communication partner of said mobile station.

6. The retransmission control apparatus as claimed in claim 4, wherein said base station receives, from said other base stations, in addition to said error judgment results, received signal power levels of said signal in said other base stations, and said base station compares each of said received signal power levels with a received signal power level in said base station, and said base station sends said response to said mobile station when said received signal power level in said base station is larger than any of said received signal power levels in said other base stations.

* * * * *